US008889096B2

(12) United States Patent
La et al.

(10) Patent No.: US 8,889,096 B2
(45) Date of Patent: Nov. 18, 2014

(54) REDUCING ALUMINOSILICATE SCALE IN THE BAYER PROCESS

(75) Inventors: Timothy La, Kardinya (AU); John D. Kildea, Baldivis (AU); Kevin L. O'Brien, Saint Charles, IL (US); Everett C. Phillips, Batavia, IL (US); Kailas B. Sawant, Aurora, IL (US); David H. Slinkman, Lombard, IL (US); Frederick J. Swiecinski, Algonquin, IL (US); Ji Cui, Aurora, IL (US)

(73) Assignee: Nalco Company, Naperville, IL (US)

( * ) Notice: Subject to any disclaimer, the term of this patent is extended or adjusted under 35 U.S.C. 154(b) by 282 days.

(21) Appl. No.: 13/035,124

(22) Filed: Feb. 25, 2011

(65) Prior Publication Data

US 2011/0212006 A1    Sep. 1, 2011

Related U.S. Application Data

(63) Continuation-in-part of application No. 12/567,116, filed on Sep. 25, 2009, now Pat. No. 8,545,776.

(51) Int. Cl.
  *C01F 7/02*    (2006.01)
  *C01F 7/47*    (2006.01)
(52) U.S. Cl.
  CPC ....................................... *C01F 7/47* (2013.01)
  USPC ........................................ 423/625; 423/127
(58) Field of Classification Search
  None
  See application file for complete search history.

(56) References Cited

U.S. PATENT DOCUMENTS

| | | | |
|---|---|---|---|
| 5,314,626 A * | 5/1994 | Dimas | 210/698 |
| 6,086,771 A | 7/2000 | Selvarajan | |
| 7,390,415 B2 | 6/2008 | Spitzer et al. | |
| 7,442,755 B2 | 10/2008 | Spitzer et al. | |
| 7,763,698 B2 | 7/2010 | Spitzer et al. | |
| 2008/0111103 A1 | 5/2008 | Heitner | |
| 2009/0026064 A1 | 1/2009 | McCausland | |
| 2010/0256317 A1 | 10/2010 | Spitzer et al. | |

FOREIGN PATENT DOCUMENTS

| | | | | |
|---|---|---|---|---|
| WO | 02070411 A1 | 9/2002 | | |
| WO | WO 2008/045677 | * | 4/2008 | C02F 1/00 |

OTHER PUBLICATIONS

Spitzer et al., "Reagents for the Elimination of Sodalite Scaling," Light Metals (2005), pp. 183-188.
International Search Report for PCT/US2010/049555 (parent PCT application).
International Search Report for PCT/2012/024099 (corresponding PCT application).

* cited by examiner

*Primary Examiner* — Robert Xu
(74) *Attorney, Agent, or Firm* — Leydig, Voit & Mayer, Ltd.

(57) ABSTRACT

The invention provides a method of inhibiting the accumulation of DSP scale in the liquor circuit of Bayer process equipment. The method includes adding one or more particular silane based small molecules to the liquor fluid circuit. These scale inhibitors reduce DSP scale formation and thereby increase fluid throughput, increase the amount of time Bayer process equipment can be operational and reduce the need for expensive and dangerous acid washes of Bayer process equipment. As a result, the invention provides a significant reduction in the total cost of operating a Bayer process.

10 Claims, 2 Drawing Sheets

US 8,889,096 B2

REDUCING ALUMINOSILICATE SCALE IN THE BAYER PROCESS

CROSS-REFERENCE TO RELATED APPLICATIONS

This application is a continuation in part of pending application Ser. No. 12/567,116 filed on Sep. 25, 2009.

STATEMENT REGARDING FEDERALLY SPONSORED RESEARCH OR DEVELOPMENT

Not Applicable.

BACKGROUND OF THE INVENTION

This invention relates to compositions of matter and methods of using them to treat scale in various industrial process streams, in particular certain silane based small molecules that have been found to be particularly effective in treating aluminosilicate scale in a Bayer process stream.

As described among other places in U.S. Pat. No. 6,814,873 the contents of which are incorporated by reference in their entirety, the Bayer process is used to manufacture alumina from Bauxite ore. The process uses caustic solution to extract soluble alumina values from the bauxite. After dissolution of the alumina values from the bauxite and removal of insoluble waste material from the process stream the soluble alumina is precipitated as solid alumina trihydrate. The remaining caustic solution known as "liquor" and/or "spent liquor" is then recycled back to earlier stages in the process and is used to treat fresh bauxite. It thus forms a fluid circuit. For the purposes of this application, this description defines the term "liquor". The recycling of liquor within the fluid circuit however has its own complexities.

Bauxite often contains silica in various forms and amounts. Some of the silica is unreactive so it does not dissolve and remains as solid material within the Bayer circuit. Other forms of silica (for example clays) are reactive and dissolve in caustic when added into Bayer process liquors, thus increasing the silica concentration in the liquor. As liquor flows repeatedly through the circuit of the Bayer process, the concentration of silica in the liquor further increases, eventually to a point where it reacts with aluminum and soda to form insoluble aluminosilicate particles. Aluminosilicate solid is observed in at least two forms, sodalite and cancrinite. These and other forms of aluminosilicate are commonly referred to, and for the purposes of this application define, the terms "desilication product" or "DSP".

DSP can have a formula of $3(Na_2O.Al_2O_3.2SiO_2.0-2H_2O).2NaX$ where X represents $OH^-$, $Cl^-$, $CO_3^{2-}$, $SO_4^{2-}$. Because DSP has an inverse solubility (precipitation increases at higher temperatures) and it can precipitate as fine scales of hard insoluble crystalline solids, its accumulation in Bayer process equipment is problematic. As DSP accumulates in Bayer process pipes, vessels, heat transfer equipment, and other process equipment, it forms flow bottlenecks and obstructions and can adversely affect liquor throughput. In addition because of its thermal conductivity properties, DSP scale on heat exchanger surfaces reduce the efficiency of heat exchangers.

These adverse effects are typically managed through a descaling regime, which involves process equipment being taken off line and the scale being physically or chemically treated and removed. A consequence of this type of regime is significant and regular periods of down-time for critical equipment. Additionally as part of the descaling process the use of hazardous concentrated acids such as sulfuric acid are often employed and this constitutes an undesirable safety hazard.

Another way Bayer process operators manage the buildup of silica concentration in the liquor is to deliberately precipitate DSP as free crystals rather than as scale. Typically a "desilication" step in the Bayer process is used to reduce the concentration of silica in solution by precipitation of silica as DSP, as a free precipitate. While such desilication reduces the overall silica concentration within the liquor, total elimination of all silica from solution is impractical and changing process conditions within various parts of the circuit (for example within heat exchangers) can lead to changes in the solubility of DSP, resulting in consequent precipitation as scale.

Previous attempts at controlling and/or reducing DSP scale in the Bayer process have included adding polymer materials containing three alkyloxy groups bonded to one silicon atom as described in U.S. Pat. No. 6,814,873 B2, US published applications 2004/0162406 A1, 2004/0011744 A1, 2005/0010008 A2, international published application WO 2008/045677 A1, and published article *Max HT™ Sodalite Scale Inhibitor: Plant Experience and Impact on the Process*, by Donald Spitzer et. al., Pages 57-62, *Light Metals* 2008, (2008) all of whose contents are incorporated by reference in their entirety.

Manufacturing and use of these trialkoxysilane-grafted polymers however can involve unwanted degrees of viscosity, making handling and dispersion of the polymer through the Bayer process liquor problematic. Other previous attempts to address foulant buildup are described in U.S. Pat. Nos. 5,650,072 and 5,314,626 both of which are incorporated by reference in their entirety.

Thus while a range of methods are available to Bayer process operators to manage and control DSP scale formation, there is a clear need for, and utility in, an improved method of preventing or reducing DSP scale formation on Bayer process equipment. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

At least one embodiment is directed towards a method for reducing siliceous scale in a Bayer process comprising the step of adding to a Bayer liquor an aluminosilicate scale inhibiting amount of reaction product between an amine-containing molecule and an amine-reactive molecule containing at least one amine-reactive group per molecule and at least one —$Si(OR)_n$ group per molecule, where n=1, 2, or 3, and R=H, C1-C12 Alkyl, Aryl, Na, K, Li, or $NH_4$, or a mixture of such reaction products.

Another embodiment is directed towards a method for reducing siliceous scale in a Bayer process comprising the step of adding to a Bayer liquor an efficacious amount of reaction product between: 1) an amine-containing small molecule, and 2) an amine-reactive small molecule containing at least one amine-reactive group per molecule and at least one —$Si(OR)_n$ group per molecule, where n=1, 2, or 3, and R=H, C1-C12 Alkyl, Aryl, Na, K, Li, or $NH_4$, or a mixture of such reaction products, and 3) a non-polymeric amine reactive hydrophobic hydrocarbon.

At least one embodiment is directed towards a method of reducing DSP in a Bayer process comprising the step of adding to the Bayer process stream an aluminosilicate scale inhibiting amount of a mixture of products as defined above.

BRIEF DESCRIPTION OF THE DRAWINGS

A detailed description of the invention is hereafter described with specific reference being made to the drawings in which.

DETAILED DESCRIPTION OF THE INVENTION

Figure 1:
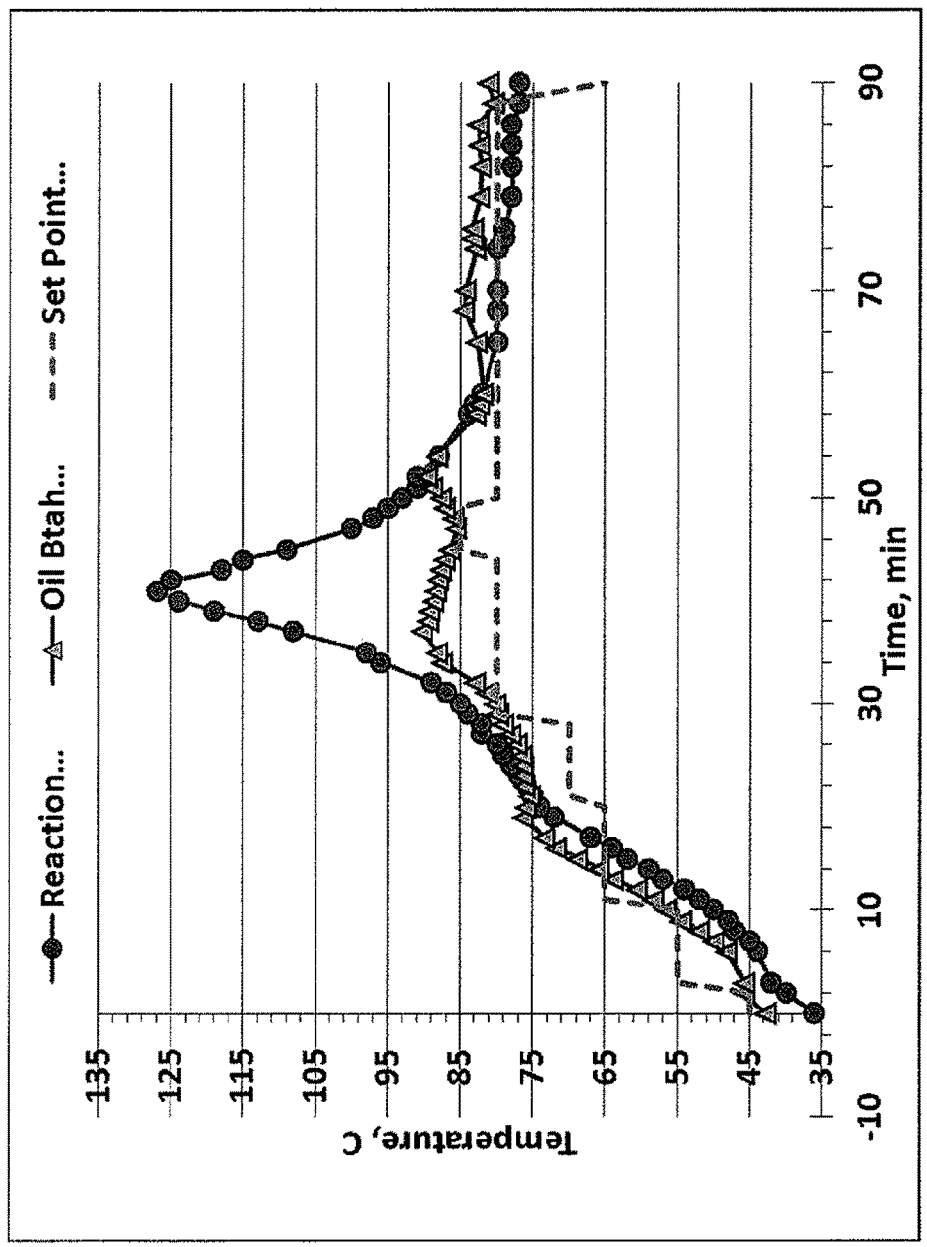
FIG. 1 is a graph illustrating a batch reaction profile of the invention.

For purposes of this application the definition of these terms is as follows:

"Polymer" means a chemical compound comprising essentially repeating structural units each containing two or more atoms. While many polymers have large molecular weights of greater than 500, some polymers such as polyethylene can have molecular weights of less than 500. Polymer includes copolymers and homo polymers.

"Small molecule" means a chemical compound comprising essentially non-repeating structural units. Because an oligomer (with more than 10 repeating units) and a polymer are essentially comprised of repeating structural units, they are not small molecules. Small molecules can have molecular weights above and below 500. The terms "small molecule" and "polymer" are mutually exclusive.

"Foulant" means a material deposit that accumulates on equipment during the operation of a manufacturing and/or chemical process which may be unwanted and which may impair the cost and/or efficiency of the process. DSP is a type of foulant.

"Amine" means a molecule containing one or more nitrogen atoms and having at least one secondary amine or primary amine group. By this definition, monoamines such as dodecylamine, diamines such as hexanediamine, and triamines such as diethylenetriamine, are all amines.

"GPS" is 3-glycidoxypropyltrimethoxysilane.

"Alkyloxy" means having the structure of OX where X is a hydrocarbon and O is oxygen. It can also be used interchangeably with the term "alkoxy". Typically in this application, the oxygen is bonded both to the X group as well as to a silicon atom of the small molecule. When X is $C_1$ the alkyloxy group consists of a methyl group bonded to the oxygen atom. When X is $C_2$ the alkyloxy group consists of an ethyl group bonded to the oxygen atom. When X is $C_3$ the alkyloxy group consists of a propyl group bonded to the oxygen atom. When X is $C_4$ the alkyloxy group consists of a butyl group bonded to the oxygen atom. When X is $C_5$ the alkyloxy group consists of a pentyl group bonded to the oxygen atom. When X is $C_6$ the alkyloxy group consists of a hexyl group bonded to the oxygen atom.

"Monoalkyloxy" means that attached to a silicon atom is one alkyloxy group.

"Dialkyloxy" means that attached to a silicon atom are two alkyloxy groups.

"Trialkyloxy" means that attached to a silicon atom are three alkyloxy groups.

"Synthetic Liquor" or "Synthetic Spent Liquor" is a laboratory created liquid used for experimentation whose composition in respect to alumina, soda, and caustic corresponds with the liquor produced by recycling through the Bayer process.

"Bayer Liquor" is actual liquor that has run through a Bayer process in an industrial facility.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology,* 5th Edition, (2005), (Published by Wiley, John & Sons, Inc.) this definition shall control how the term is to be defined in the claims.

In the Bayer process for manufacturing alumina, bauxite ore passes through a grinding stage and alumina, together with some impurities including silica, are dissolved in added liquor. The mixture then typically passes through a desilication stage where silica is deliberately precipitated as DSP to reduce the amount of silica in solution. The slurry is passed on to a digestion stage where any remaining reactive silica dissolves, thus again increasing the concentration of silica in solution which may subsequently form more DSP as the process temperature increases. The liquor is later separated from undissolved solids, and alumina is recovered by precipitation as gibbsite. The spent liquor completes its circuit as it passes through a heat exchanger and back into the grinding stage. DSP scale accumulates throughout the Bayer process but particularly at the digestion stage and most particularly at or near the heat exchanger, where the recycled liquor passes through.

In this invention, it was discovered that dosing of various types of silane-based products can reduce the amount of DSP scale formed.

In at least one embodiment of the invention, an effective concentration of a silane-based small molecule product is added to some point or stage in the liquor circuit of the Bayer process, which minimizes or prevents the accumulation of DSP on vessels or equipment along the liquor circuit.

In at least one embodiment, the small molecule comprises the reaction product between an amine and at least one amine-reactive silane, the silicon of the silane can be monoalkyloxy, dialkyloxy, trialkyloxy or trihydroxy.

In at least one embodiment the small molecule is a reaction product between an amine-containing small molecule and an amine-reactive molecule containing at least one amine-reactive group per molecule and at least one —$Si(OR)_n$ group per molecule, where n=1, 2, or 3, and R=H, C1-C12 Alkyl, Aryl, Na, K, Li, or $NH_4$, or a mixture of such reaction products.

In at least one embodiment the method for the reduction of aluminosilicate containing scale in a Bayer process comprises the steps of:

adding to the Bayer process stream an aluminosilicate scale inhibiting amount of a composition comprising at least one small molecule, the at least one small molecule comprising of at least three components, one being an $R_1$ component, one being an $R_2$ component and one being an $R_3$ component, the components within the small molecule arranged according to the general formula:

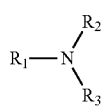

wherein the small molecule may be at least one of carbonates, bicarbonates, carbamates, ureas, amides and salts thereof and:
  (i) $R_1$ is selected from the group consisting of: H, alkyl, amine, structure (A) and structure (B);

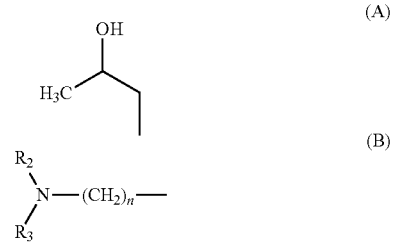

(ii) $R_2$ is independently selected from the group consisting of: H, alkyl, amine, G and E,
  G being one item selected from the group consisting of: 3-glycidoxypropyltrimethoxysilane, 3-glycidoxypropyltrialkoxysilane, 3-glycidoxypropylalkyldialkoxysilane, 3-glycidoxypropyldialkylmonoalkoxysilane, 3-isocyanatopropyltrialkoxysilane, 3-isocyanatopropylalkyldialkoxysilane, 3-isocyanatopropyldialkylmonoalkoxysilane, 3-chloropropyltrialkoxysilane, 3-chloropropylalkyldialkoxysilane, and 3-chloropropyldialkylmonoalkoxysilane;
  E being 2-ethylhexyl glycidyl ether, $C_3$-$C_{22}$ glycidyl ether, $C_3$-$C_{22}$ isocyanate, $C_3$-$C_{22}$ chloride, $C_3$-$C_{22}$ bromide, $C_3$-$C_{22}$ iodide, $C_3$-$C_{22}$ sulfate ester, $C_3$-$C_{22}$ phenolglycidyl ether, and any combination thereof,
  (iii) $R_3$ is independently selected from the group consisting of: H, alkyl, amine, G and E and
  (iv) n is an integer from 2 to 6.

In at least one embodiment the $R_1$ is independently selected from the group consisting of: monoisopropanol amine, ethylene diamine, diethylene triamine, tetraethylene pentamine, isophoronediamine, xylenediamine, bis(aminomethyl)cyclohexane, hexanediamine, C,C,C-trimethylhexanediamine, methylene bis(aminocyclohexane), saturated fatty amines, unsaturated fatty amines such as oleylamine and soyamine, N-fatty-1,3-propanediamine such as cocoalkylpropanediamine, oleylpropanediamine, dodecylpropanediamine, hydrogenized tallow alkylpropanediamine, and tallow alkylpropanediamine and any combination thereof.

In at least one embodiment said small molecule is selected from the group consisting of: (I), (II), (III), (IV), (V), (VI), (VII), (VIII), and (IX):

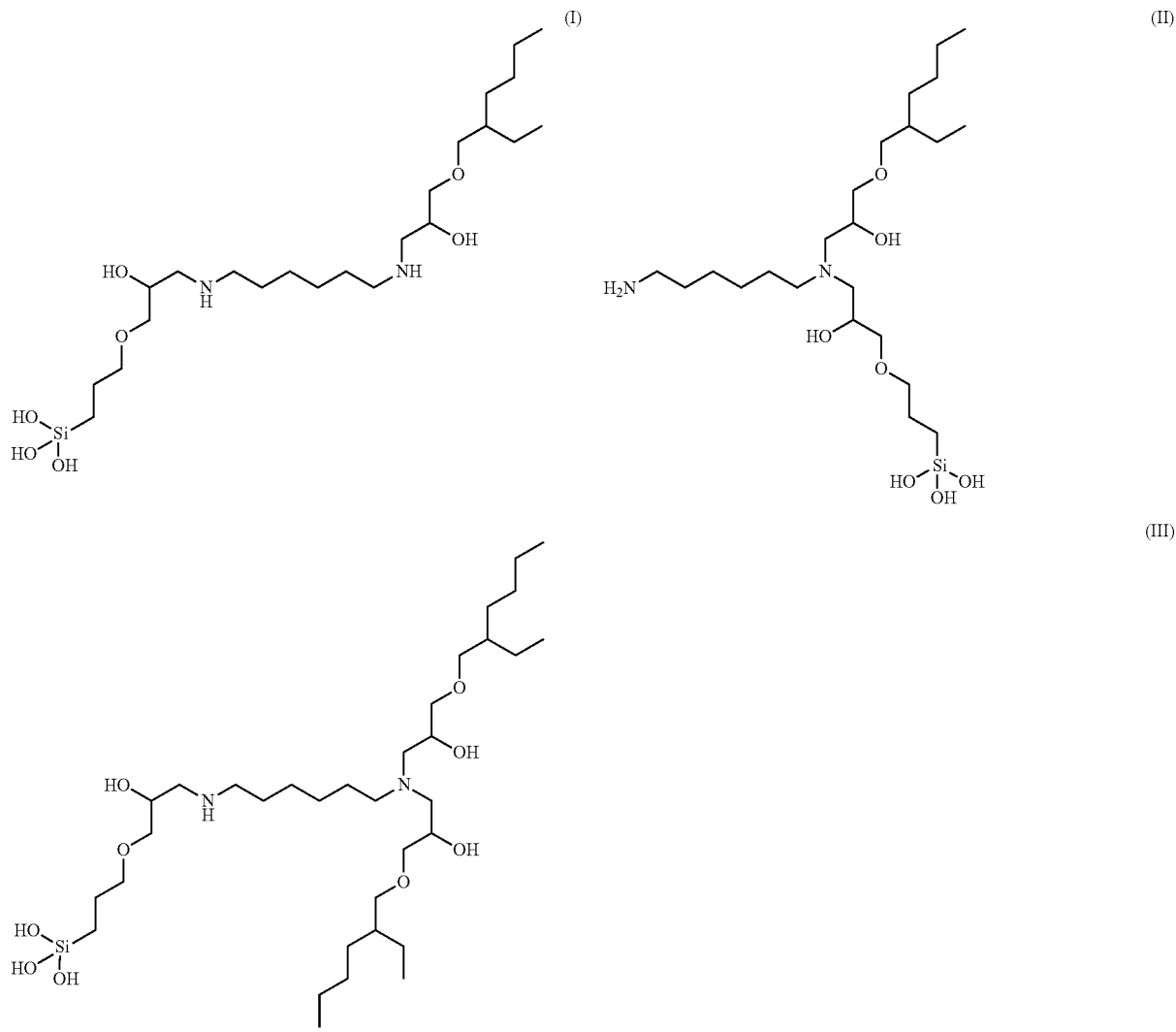

(IV)
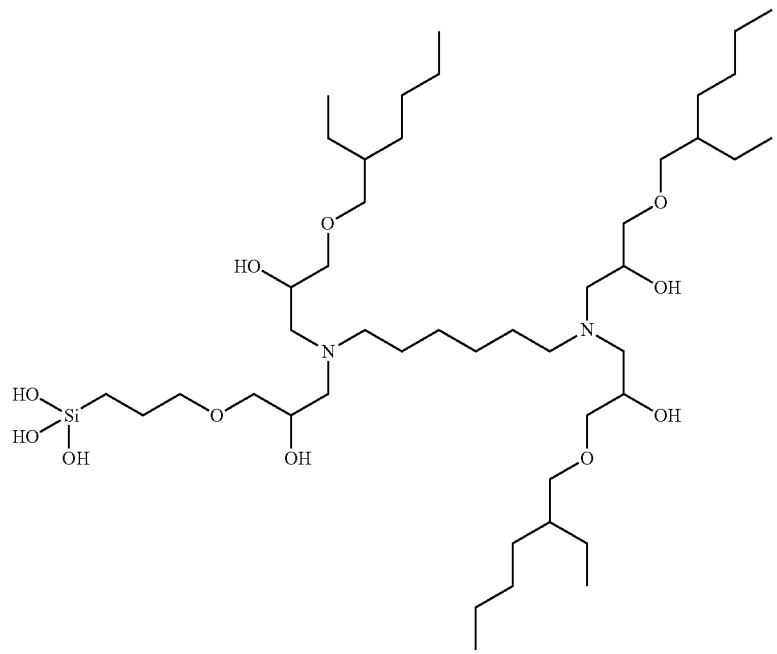
(V)
(VI)
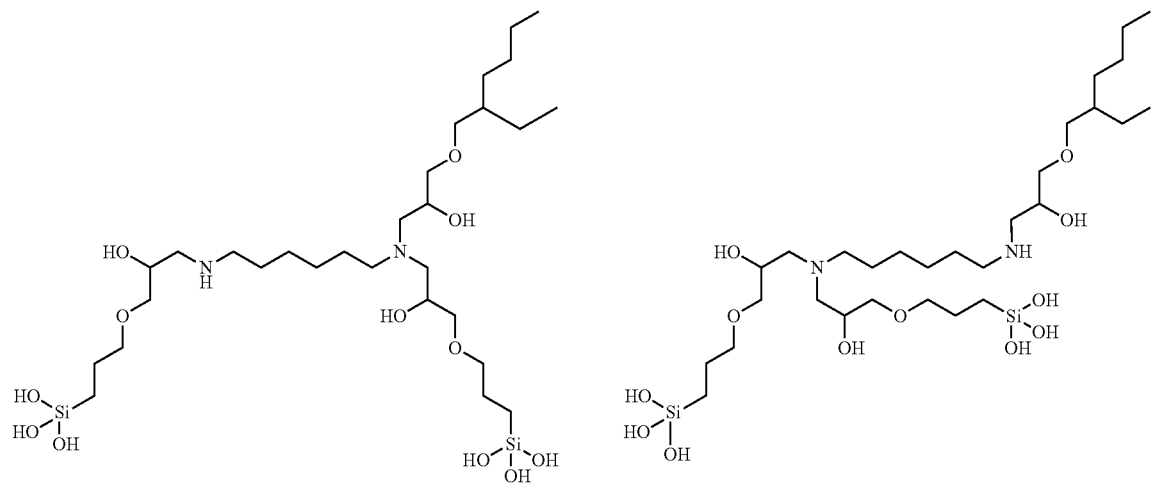
(VII)
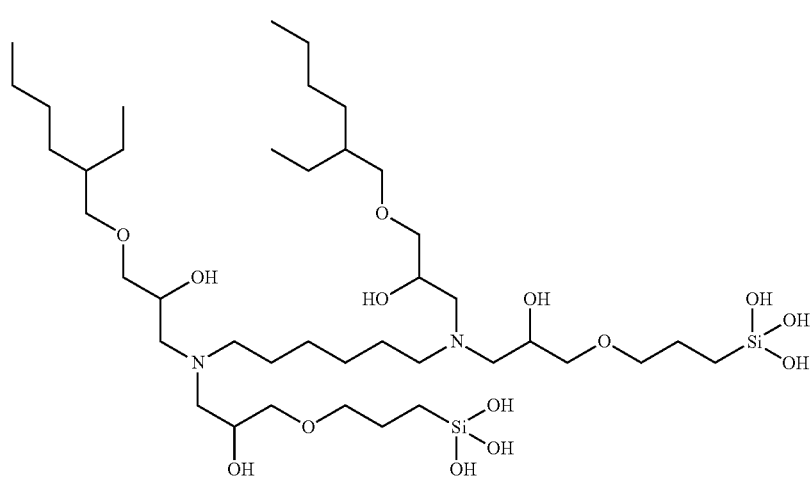

(VIII)
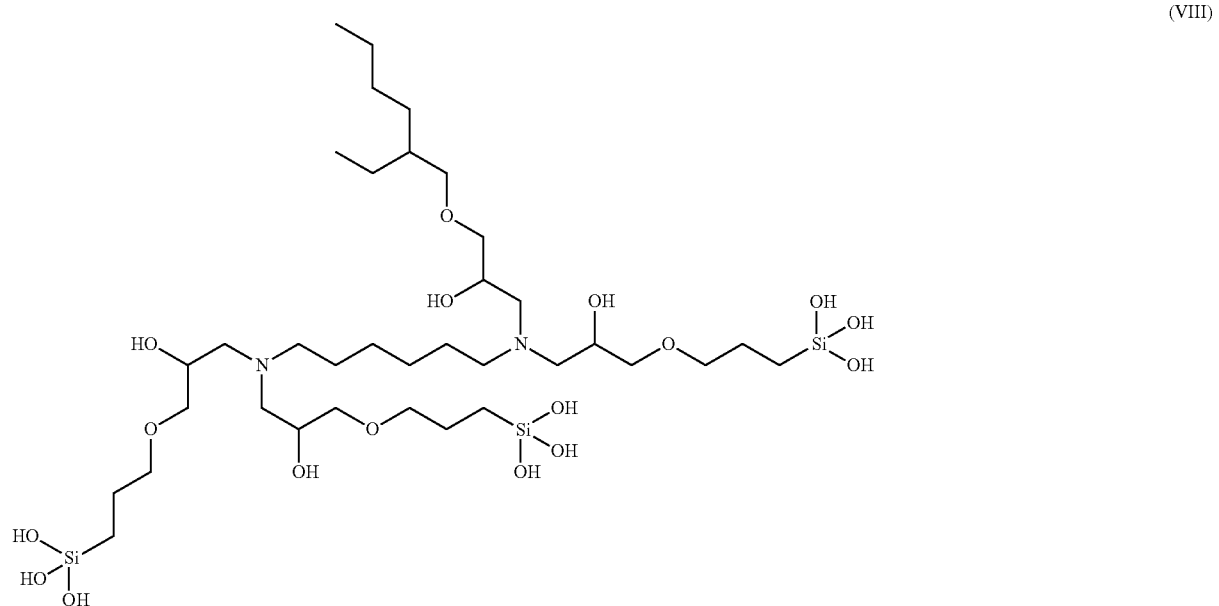
(IX)
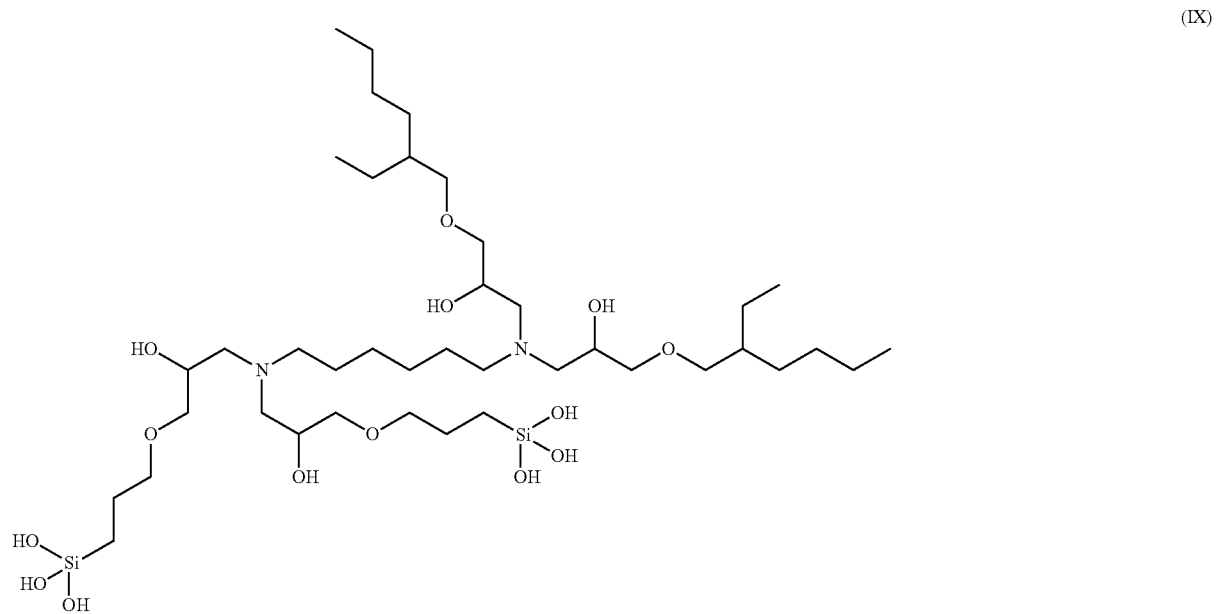 [SMILES: CCCCC(CC)COCC(O)CN(CCCCCCN(CC(O)COCCC[Si](O)(O)O)CC(O)COCCC[Si](O)(O)O)CC(O)COCC(CC)CCCC]

In at least one embodiment the small molecule is selected from the group consisting of: (X) (XI), (XII), (XIII), (XIV), (XV), (XVI), (XVII), (XVIII), and (XIX):
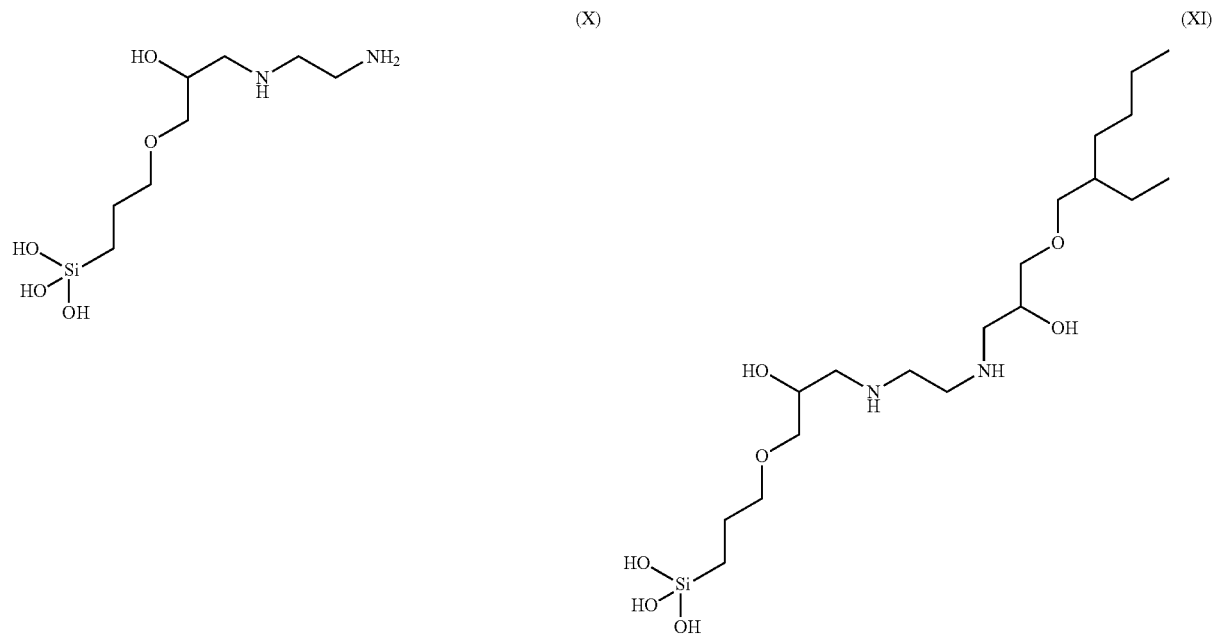
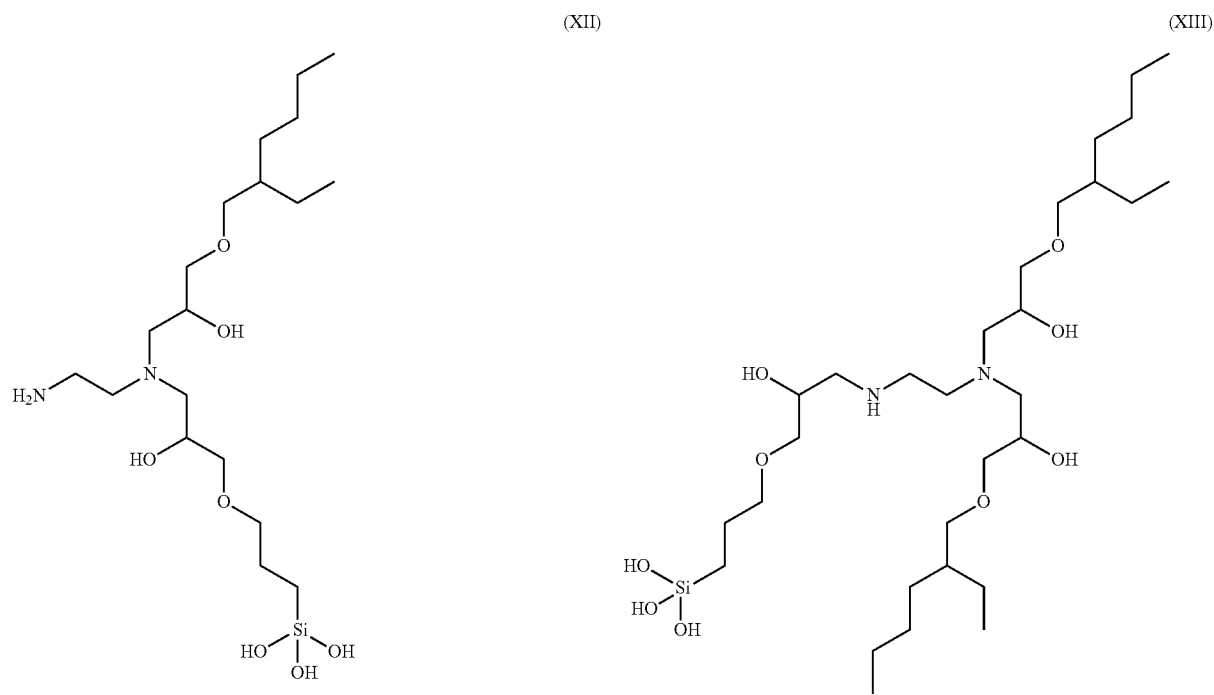

-continued
(XIV)
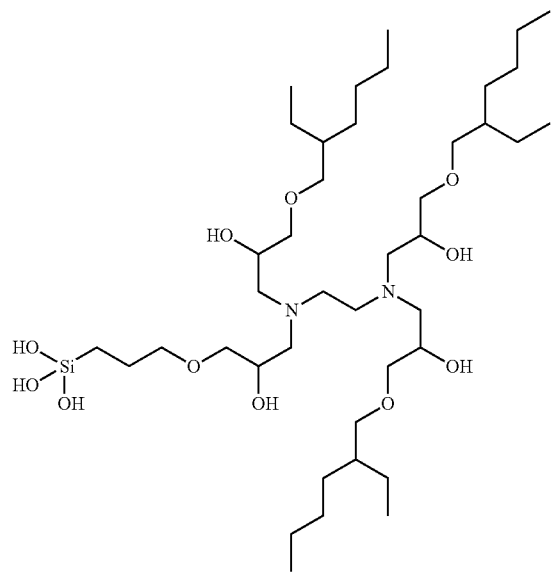
(XV)
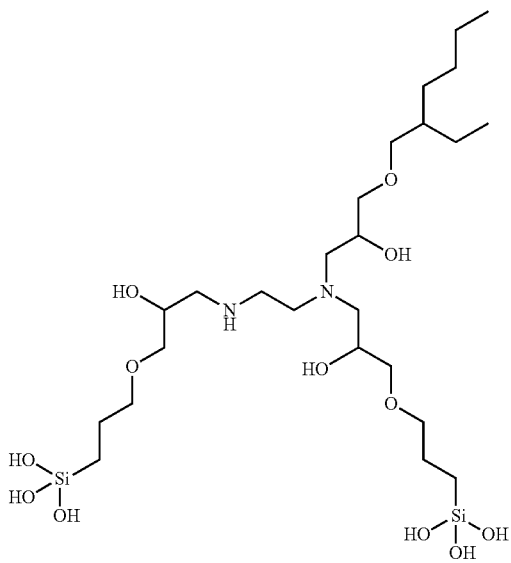
(XVI)
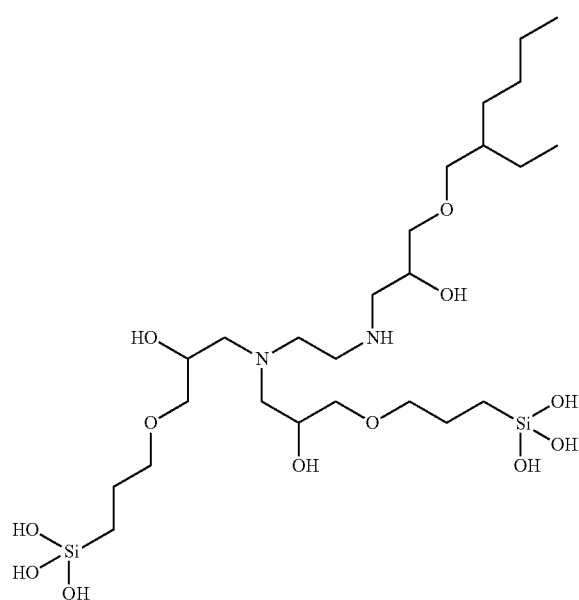
(XVII)
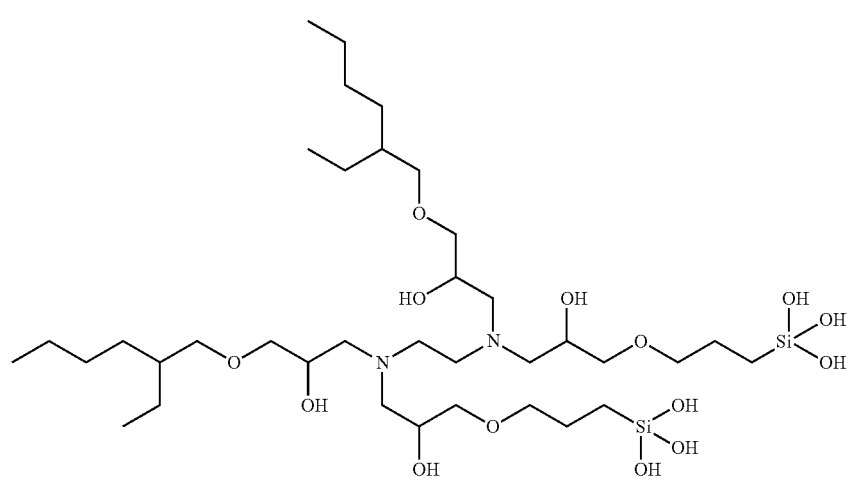

(XVIII)
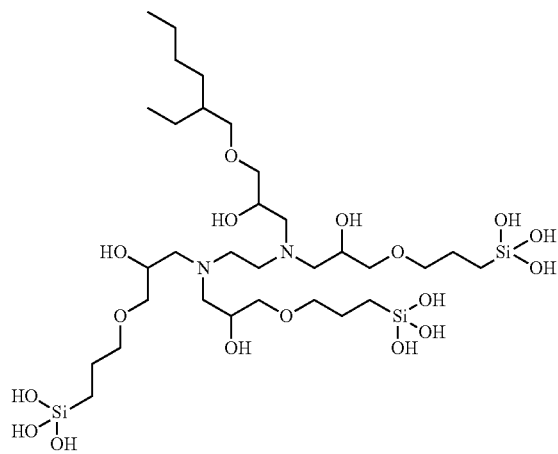
(XIX)
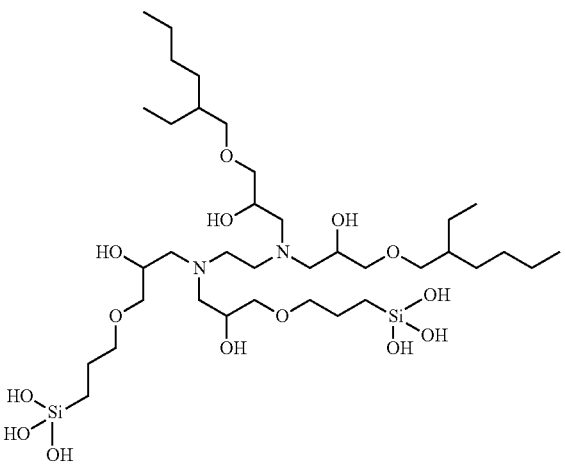
In at least one embodiment the small molecule is selected from the group consisting of: (XX), (XXI), and (XXII):
(XX)
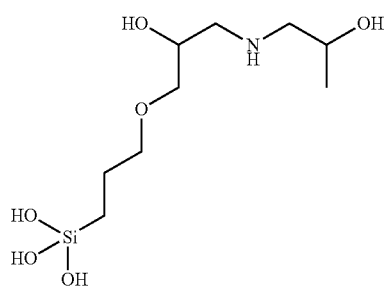
(XXII)
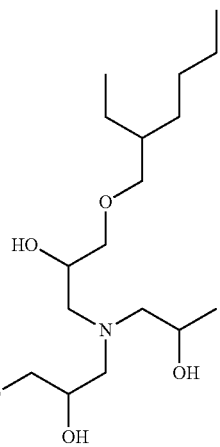
In at least one embodiment the small molecule is selected from the group consisting of: (XVIII), (XXIV), (XXV), (XXVI), (XXVII), (XVIII), and (XIX):
(XXI)
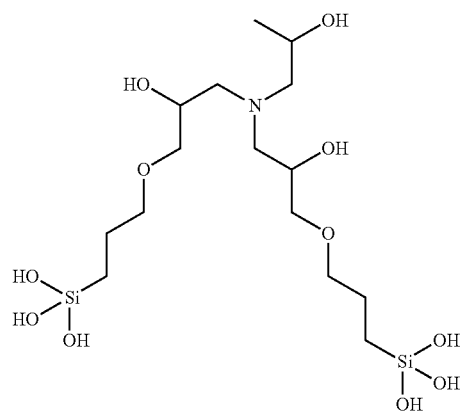
(XXIII)
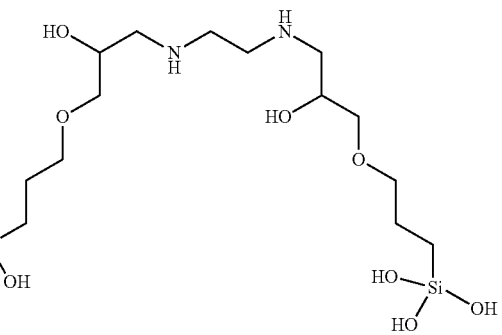

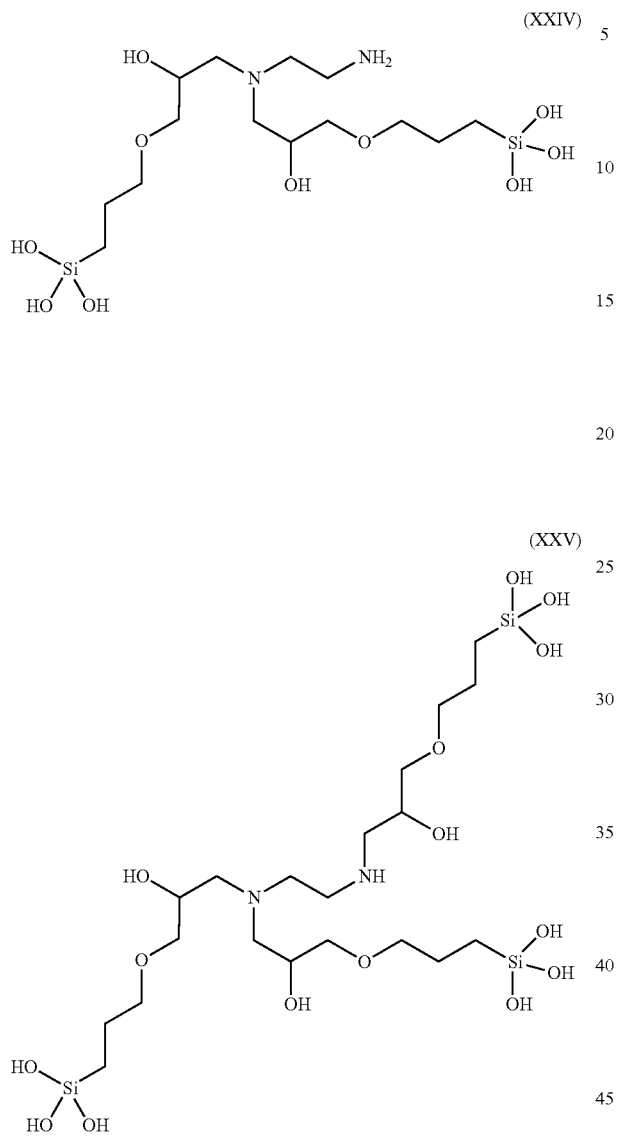
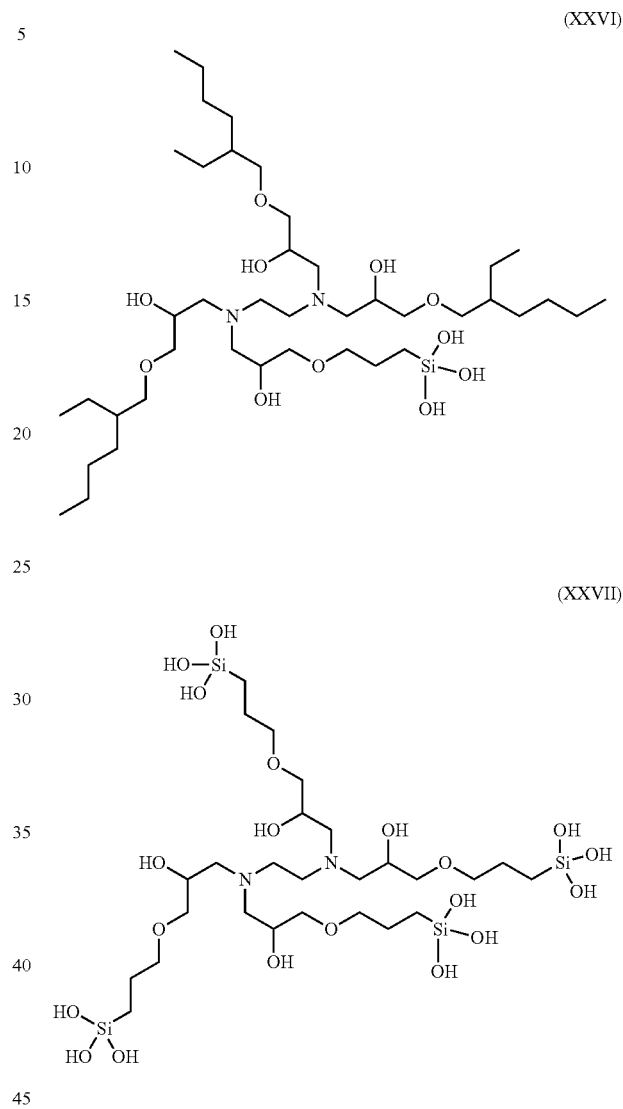
In at least one embodiment the small molecule is selected from the group consisting of: (XXVIII), (XXIX), (XXX), (XXXI), (XXXII) and combinations thereof:
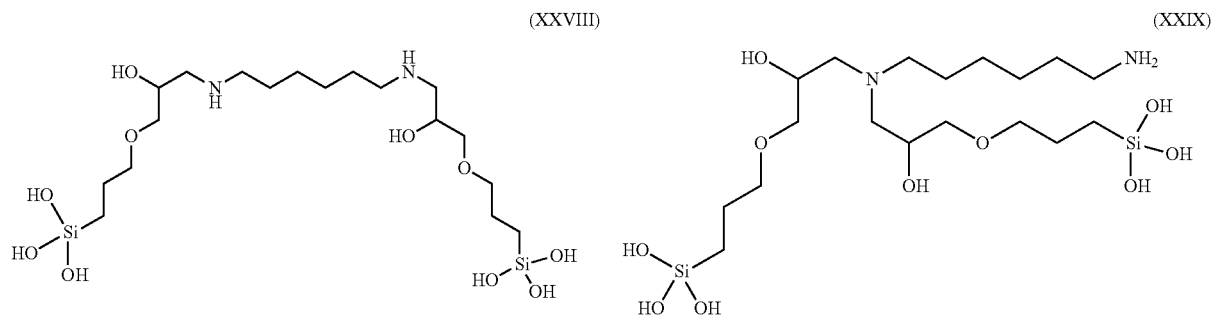

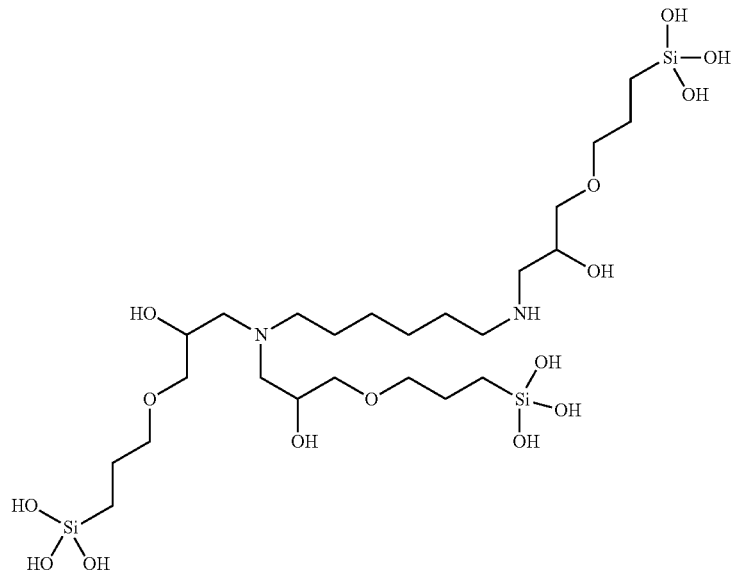
(XXX)
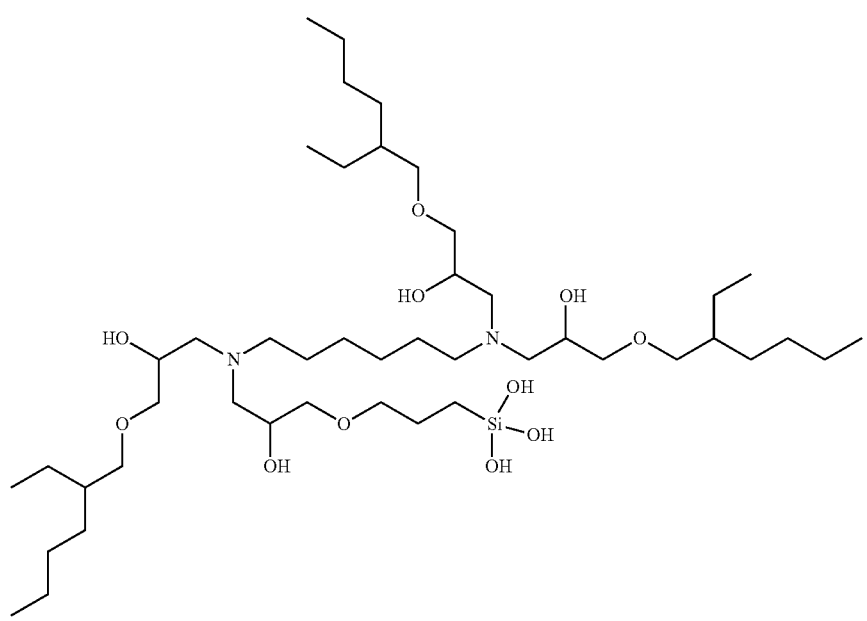
(XXXI)

(XXXII)
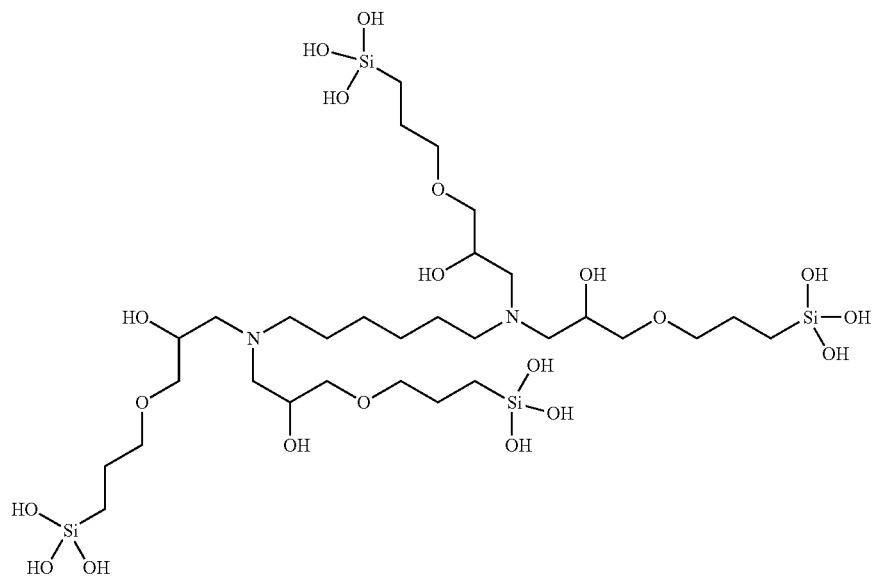
In at least one embodiment the small molecule is selected from the group consisting of: (XXXIII), (XXXIV), (XXXV), (XXXVI), (XXXVII), (XXXVIII), (XXXIX), (XL), (XLI), and (XLII):
(XXXIII)
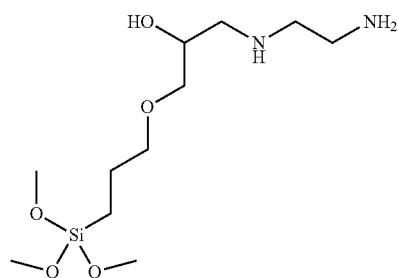
(XXXIV)
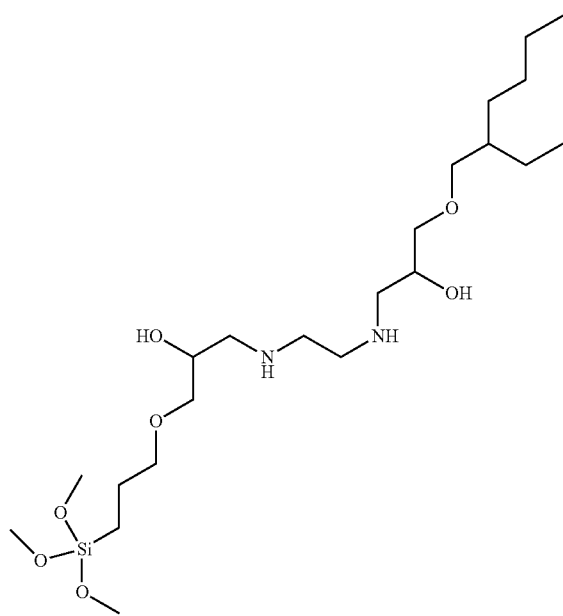

-continued
(XXXV)
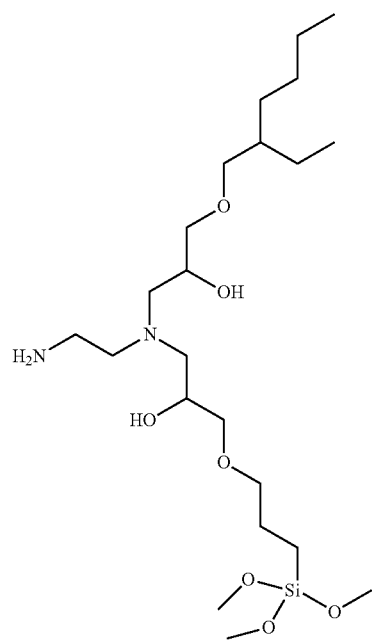
(XXXVI)
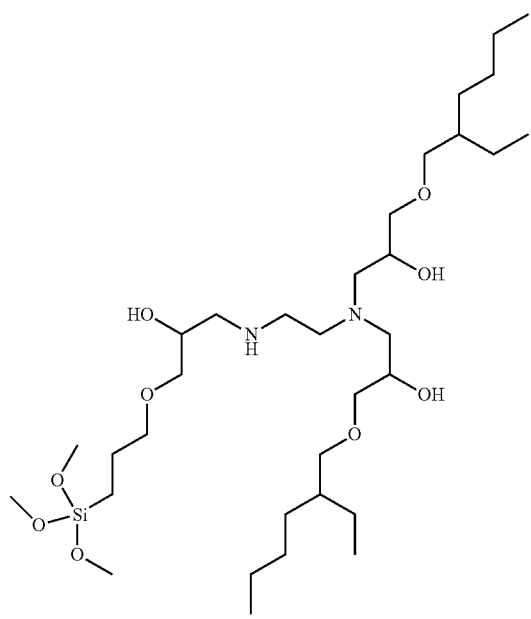
(XXXVII)
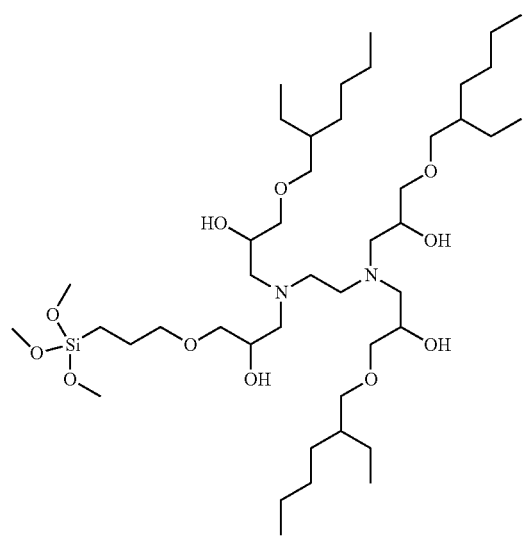
(XXXVIII)
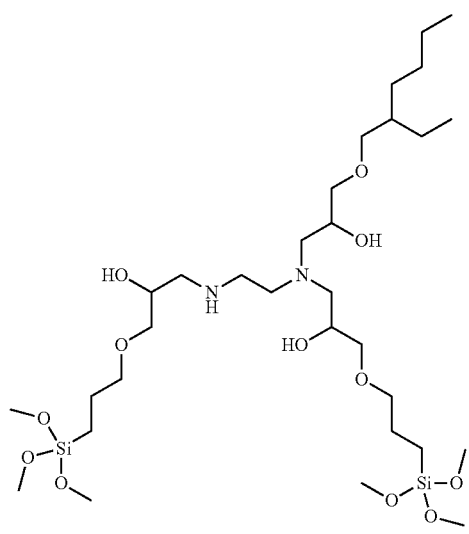

-continued
(XXXIX)
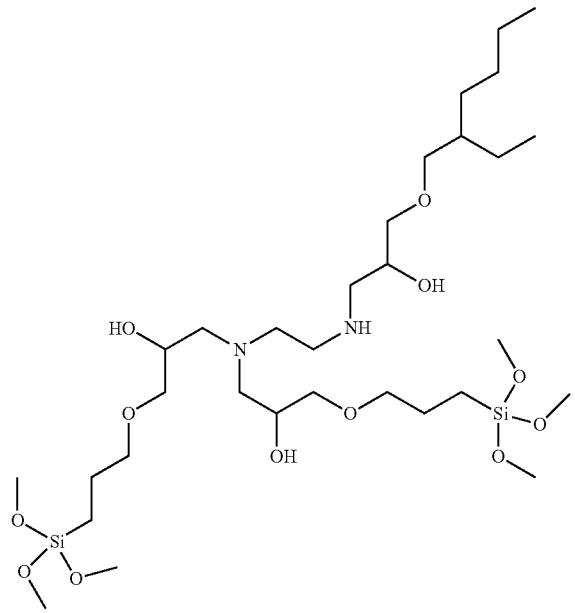
(XL)
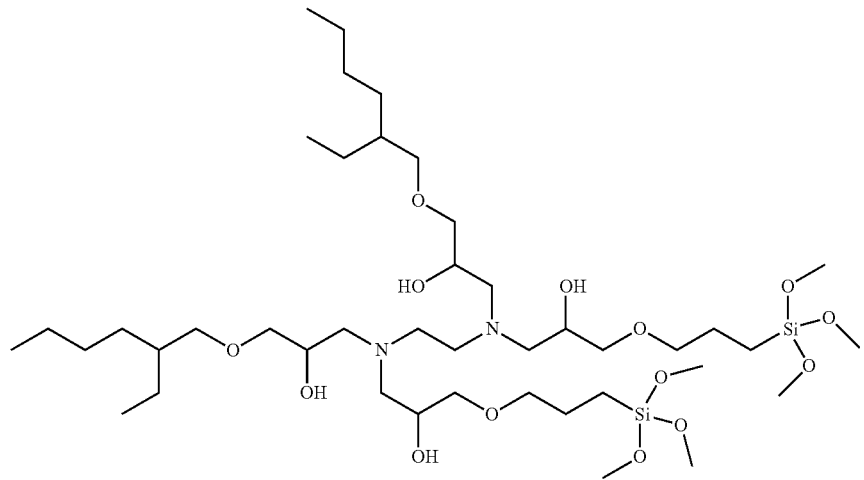
(XLI)
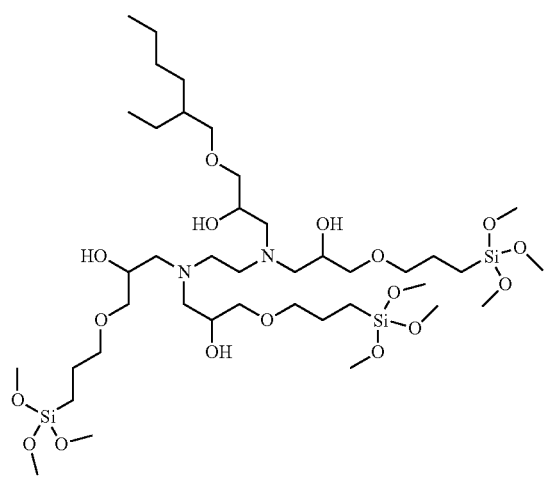
(XLII)
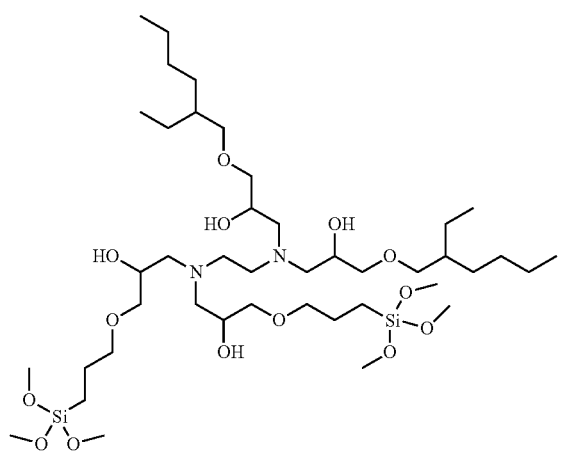

In at least one embodiment the small molecule is selected from the group consisting of (XLIII), (XLIV), (XLV), (XLVI), (XLVII), (XLVIII), (XLIX), (L), (LI), and (LII):
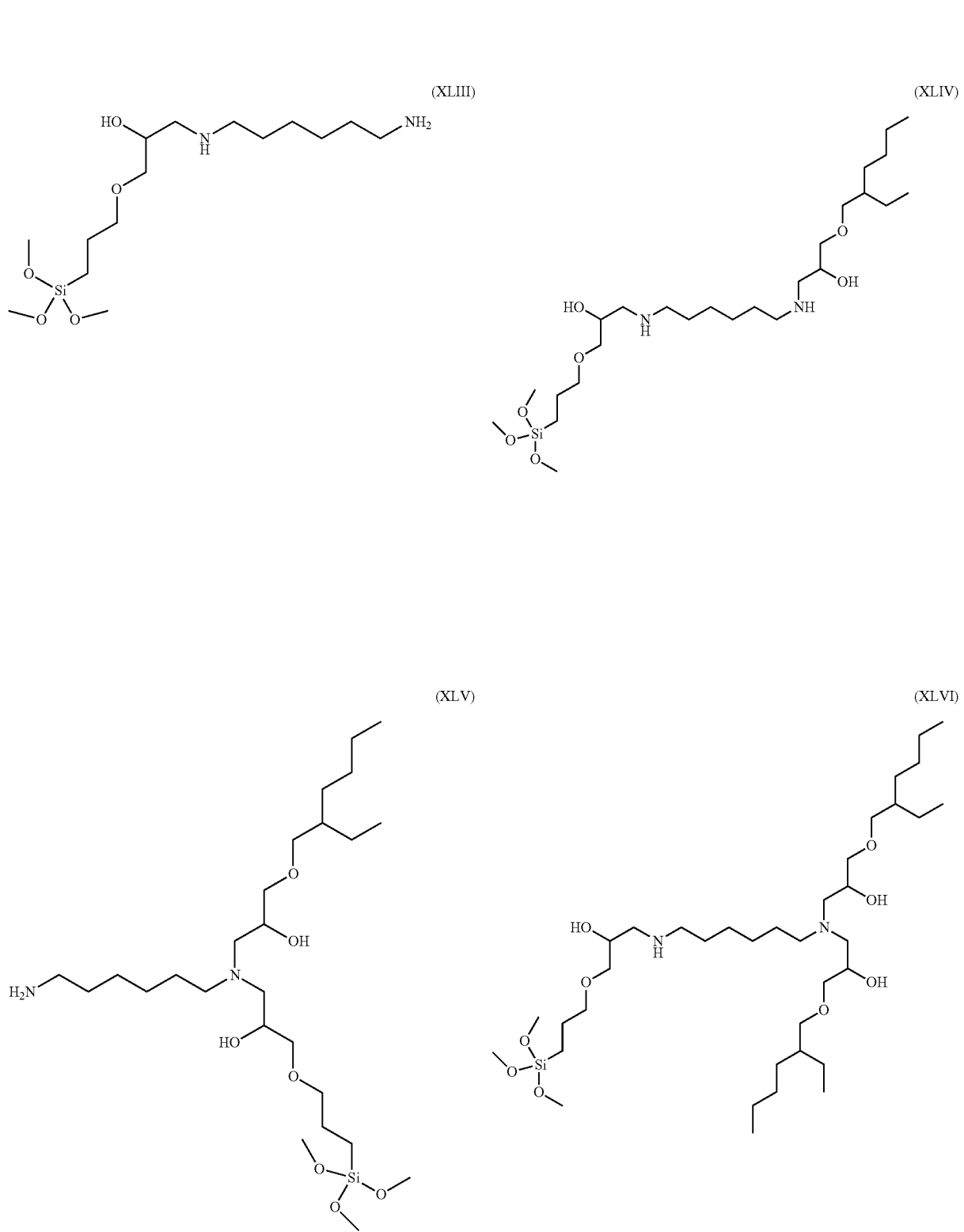

(XLVII)
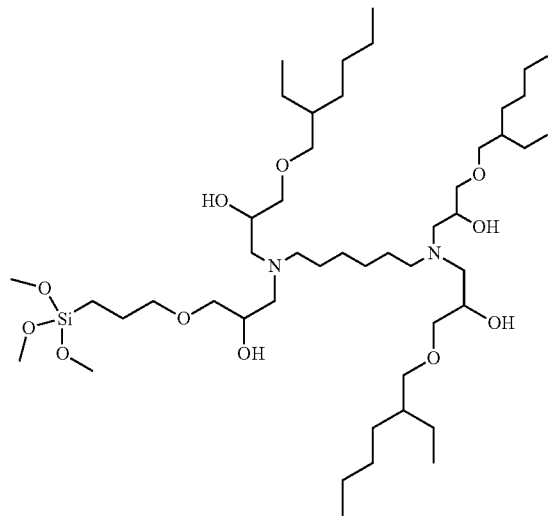
(XLVIII)
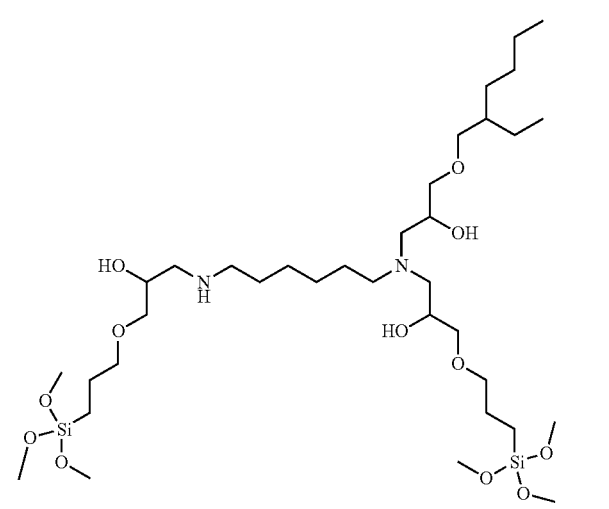
(XLIX)
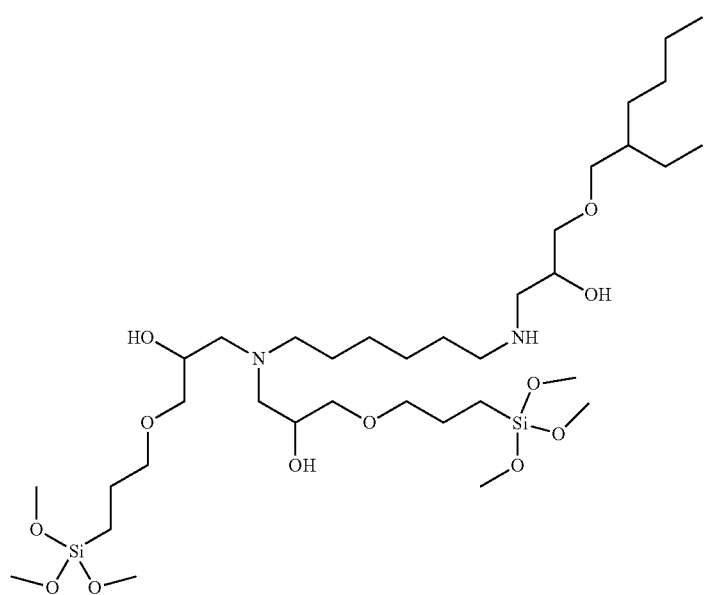
(L)
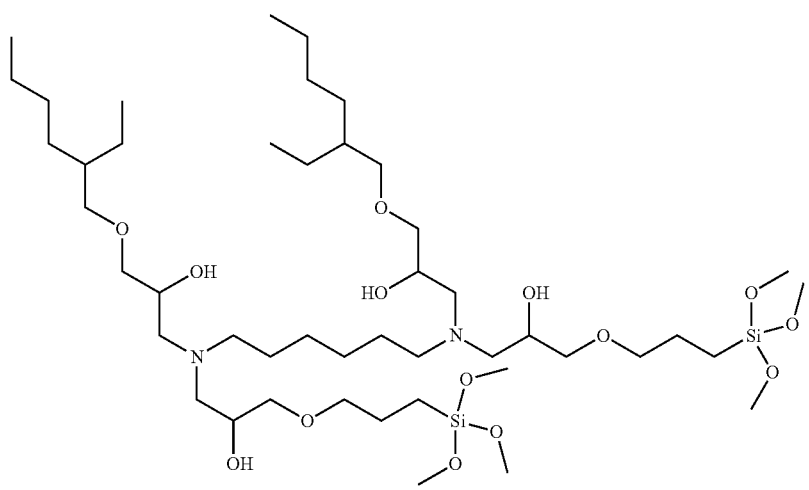

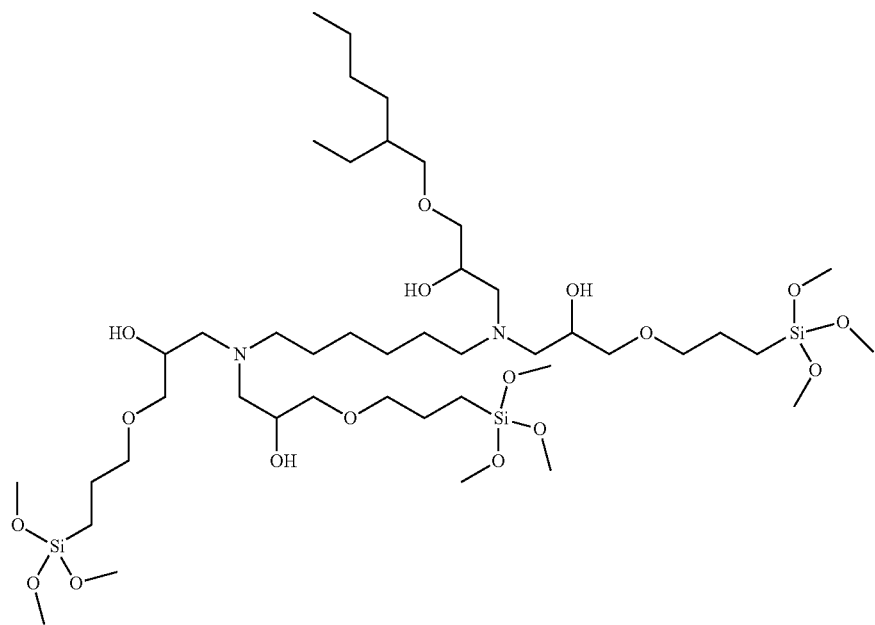
(LI)
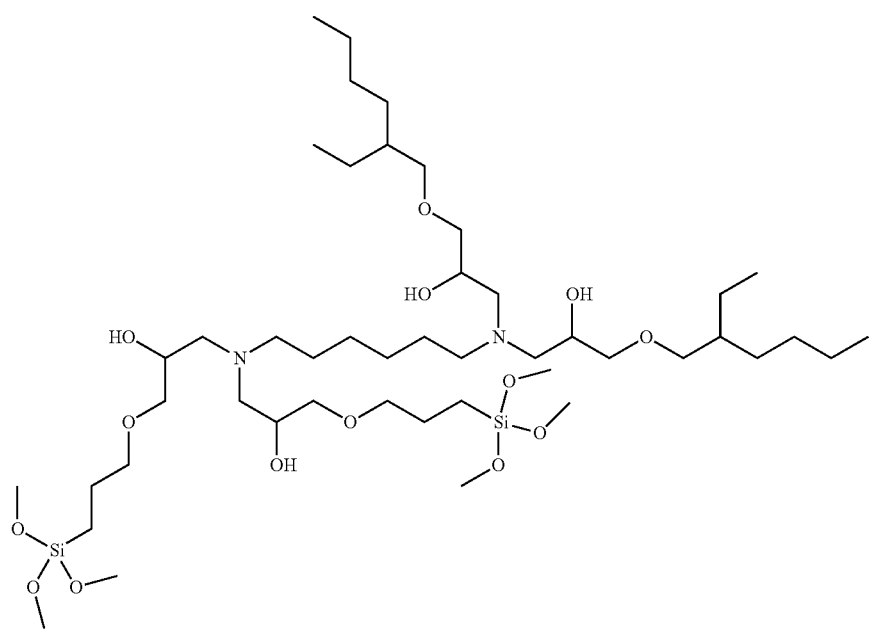
(LII)

In at least one embodiment the small molecule is selected from the group consisting of: (LIII), (LIV), and (LV):
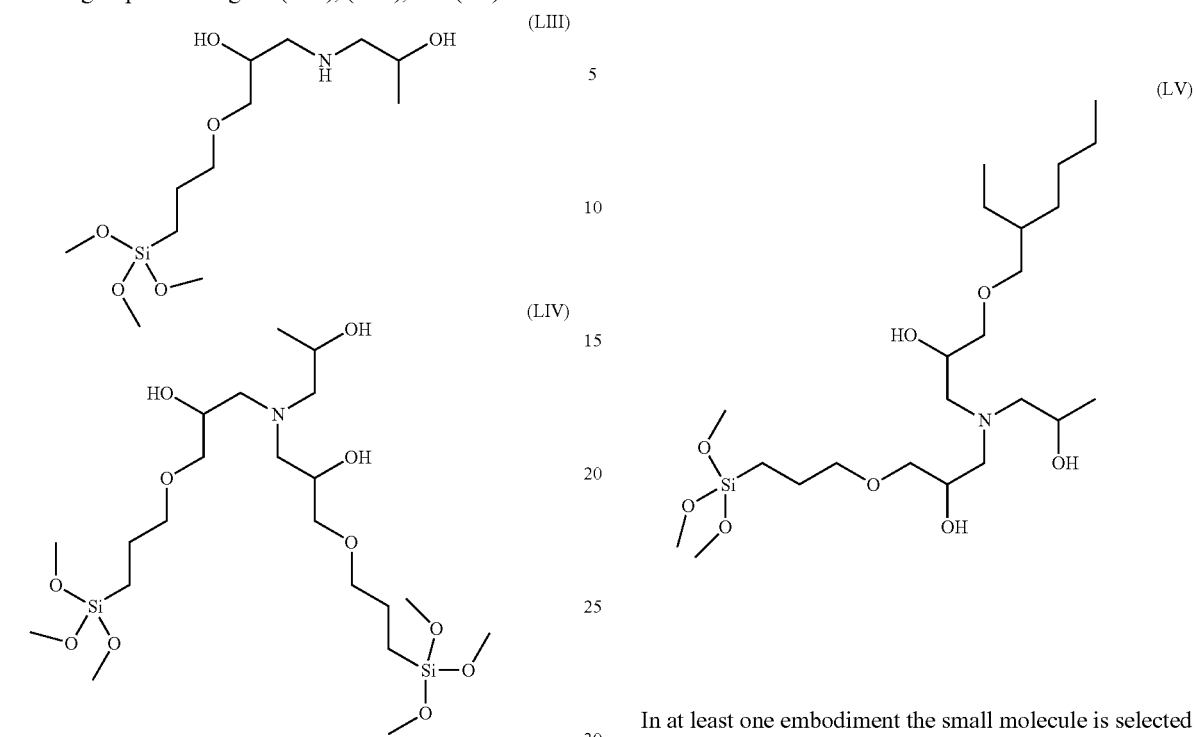
In at least one embodiment the small molecule is selected from the group consisting of: (LVI), (LVII), (LVIII), (LIX), (LX), (LI), and (LII):
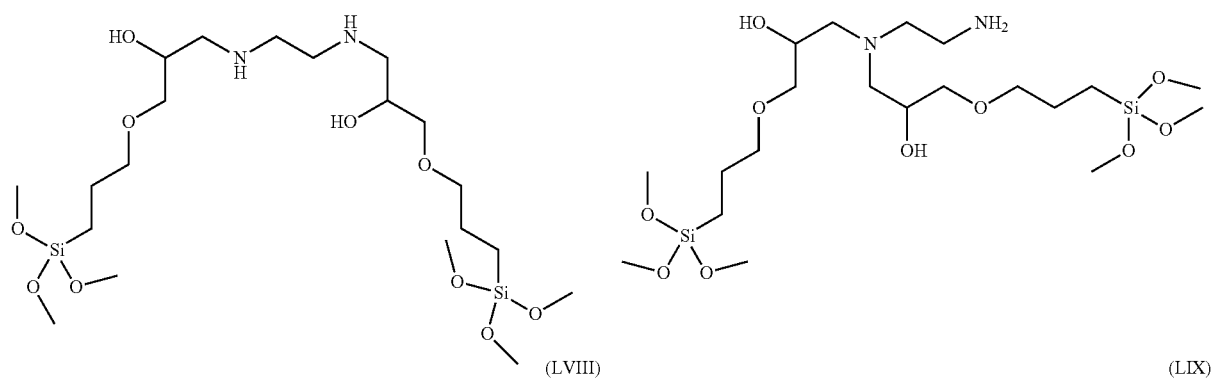
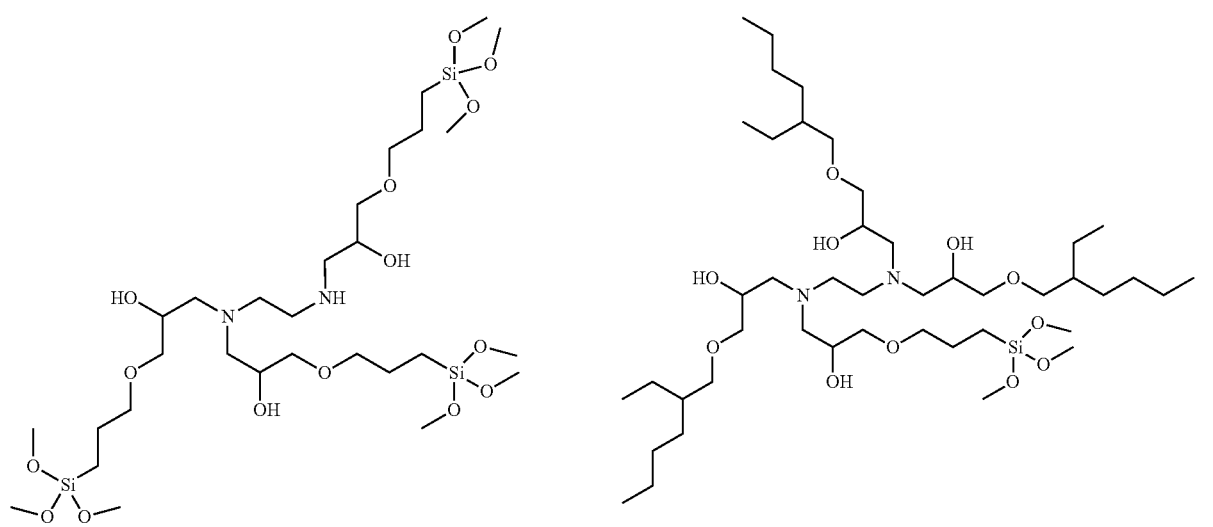

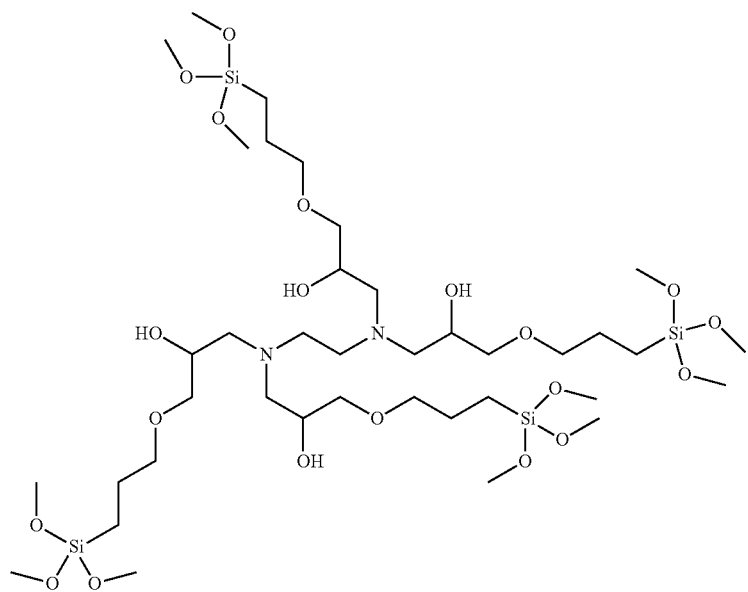
(LX)
In at least one embodiment the small molecule is selected from the group consisting of: (LXI), (LXII), (LXIII), and (LXIV):
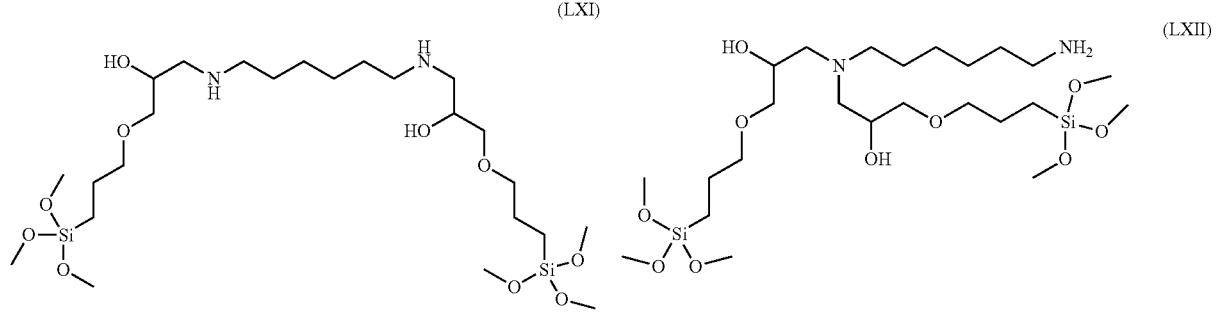
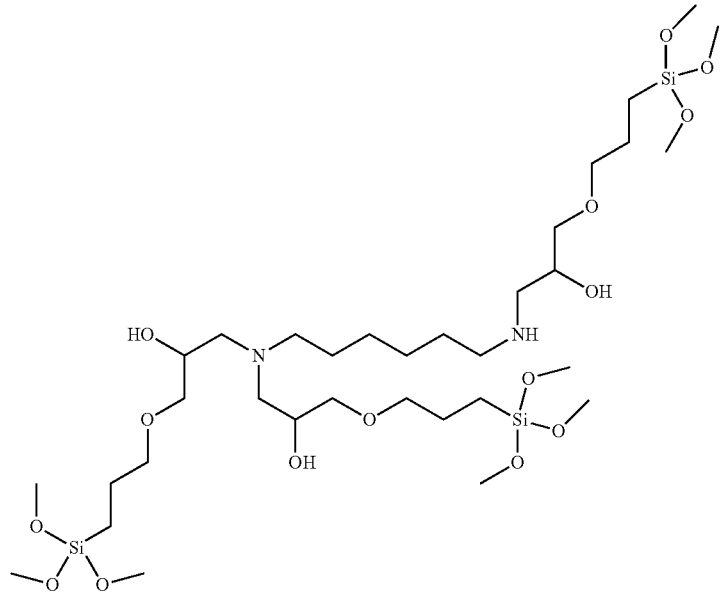

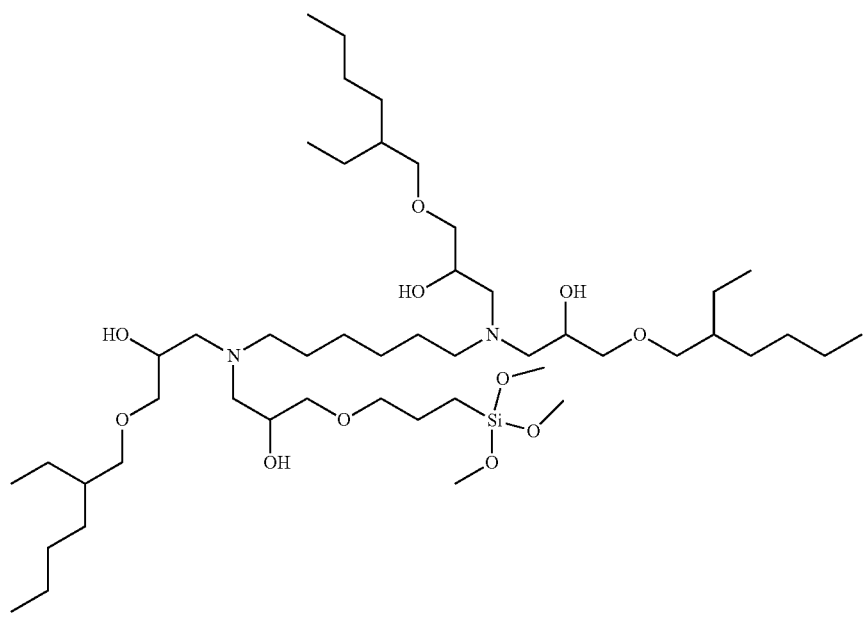

(LXIV)

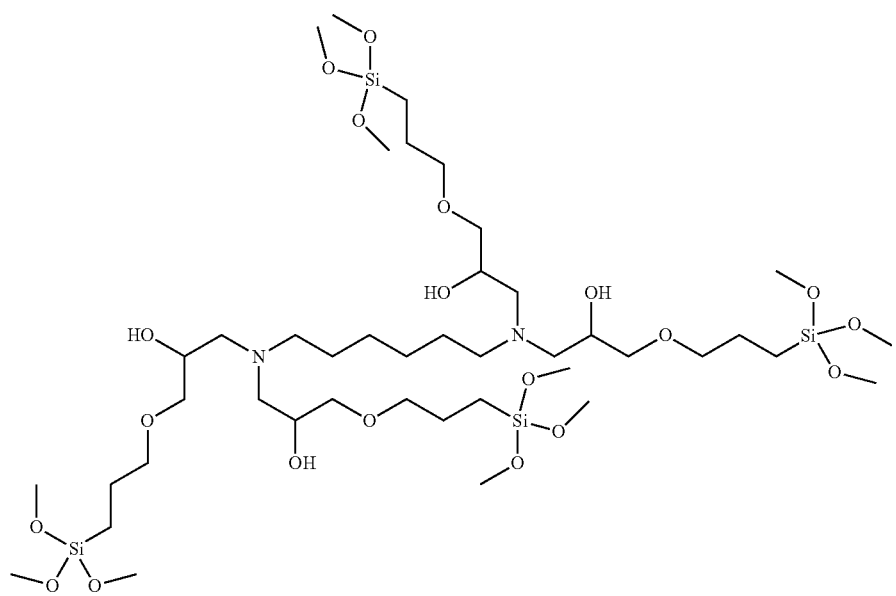

(LXV)

In at least one embodiment the small molecule is present in a solution in an amount ranging from about 0.01 to about 100 wt %. The composition may further comprise one item selected from the list consisting of amines, activators, antifoaming agents, co-absorbents, corrosion inhibitors, coloring agents, and any combination thereof. The composition may comprise a solvent, the solvent is selected from the group consisting of: water, alcohols, polyols, other industrial solvents, organic solvents, and any combination thereof. The components may be isolated from the reaction in the form of a solid, precipitate, salt and/or crystalline material in pH's ranging from 0 to 14.

Although some of these small molecules have been mentioned in various references, their uses are for entirely unrelated applications and their effectiveness in reducing Bayer Process scale was wholly unexpected. Some places where these or similar small molecules have been mentioned include: U.S. Pat. No. 6,551,515, scientific papers: *Ethylenediamine attached to silica as an efficient, reusable nanocatalyst for the addition of nitromethane to cyclopentenone*, By DeOliveira, Edimar; Prado, Alexandre G. S., *Journal of Molecular Catalysis*(2007), 271(1-2), 6369, *Interaction of divalent copper with two diaminealkyl hexagonal mesoporous silicas evaluated by adsorption and thermochemical data*, By Sales, Jose; Prado, Alexandre; and Airoldi, Claudio, *Surface Science*, Volume 590, Issue 1, pp. 51-62 (2005), and *Epoxide silyant agent ethylenediamine reaction product anchored on silica gel-thermodynamics of cation-nitrogen interaction at solid/liquid interface*, *Journal of Noncrystalline Solids*, Volume 330, Issue 1-3, pp. 142-149 (2003), international patent applications: WO 2003002057 A2, WO 2002085486, WO 2009056778 A2 and WO 2009056778 A3, French Patents: 2922760 A1 and 2922760 B1, European Patent: 2214632 A2, and Chinese patent application: CN 101747361.

The effectiveness of these small molecules was unexpected as the prior art teaches that only high molecular weight polymers are effective. Polymer effectiveness was presumed to depend on their hydrophobic nature and their size. This was confirmed by the fact that cross-linked polymers are even more effective than single chain polymers. As a result it was assumed that small molecules only serve as building blocks for these polymers and are not effective in their own right. (WO 2008/045677 [0030]). Furthermore, the scientific literature states "small molecules containing" . . . "[an] Si—$O_3$ grouping are not effective in preventing sodalite scaling" . . . because . . . "[t]he bulky group" . . . "is essential [in] keeping the molecule from being incorporated into the growing sodalite." *Max HT™ Sodalite Scale Inhibitor: Plant Experience and Impact on the Process*, by Donald Spitzer et. al., Page 57, *Light Metals* 2008, (2008). However it has recently been discovered that in fact, as further explained in the provided examples, small molecules such as those described herein are actually effective at reducing DSP scale.

It is believed that there are at least three advantages to using a small molecule-based inhibitor as opposed to a polymeric inhibitor with multiple repeating units of silane and hydrophobes. A first advantage is that the smaller molecular weight of the product means that there are a larger number of active, inhibiting moieties available around the DSP seed crystal sites at the DSP formation stage. A second advantage is that the lower molecular weight allows for an increased rate of diffusion of the inhibitor, which in turn favors fast attachment of the inhibitor molecules onto DSP seed crystals. A third advantage is that the lower molecular weight avoids high product viscosity and so makes handling and injection into the Bayer process stream more convenient and effective.

EXAMPLES

The foregoing may be better understood by reference to the following examples, which are presented for purposes of illustration and are not intended to limit the scope of the invention.

I. Example of a Synthesis Reaction A, E and G.

In a typical synthesis reaction the three constituents: A (e.g., hexane diamine), G (e.g. 3-glycidoxypropyltrimethoxysilane) and E (e.g. ethyl hexyl glycidyl ether) are added to a suitable reaction vessel at a temperature between 23-40° C. and allowed to mix. The reaction vessel is then warmed to 65-70° C. during which time the reaction begins and a large exotherm is generated. The reaction becomes self-sustaining and depending on the scale of the reaction, can reach temperatures as high as 125 to 180° C. (see FIG. 1). Typically the reaction is complete after 1 to 2 hours and then the mixture is allowed to cool down. As an aspect of this invention this un-hydrolyzed product mixture can be isolated as a liquid or gel or a solid in a suitable manner. Alternatively, the reaction product mixture can be hydrolyzed, via a number of methods, to prepare a solution of the hydrolyzed product mixture in water. The hydrolysis of the alkoxysilane groups in the component G results in the formation of the corresponding alcohol (e.g. methanol, ethanol etc., depending on the akloxysilane used in the synthesis).

It is common to those skilled in the art to conduct the ring opening of an epoxide with a reactive amine in a batch mode (where the components are mixed together), heated to an initiation temperature above room temperature (e.g. 50-65° C.) with the reaction temperatures allowed to reach as high as 125 to 180° C. This can cause internal cross-linking and side reactions to occur—which is often desired in the resin manufacturing processes.

Figure 2:
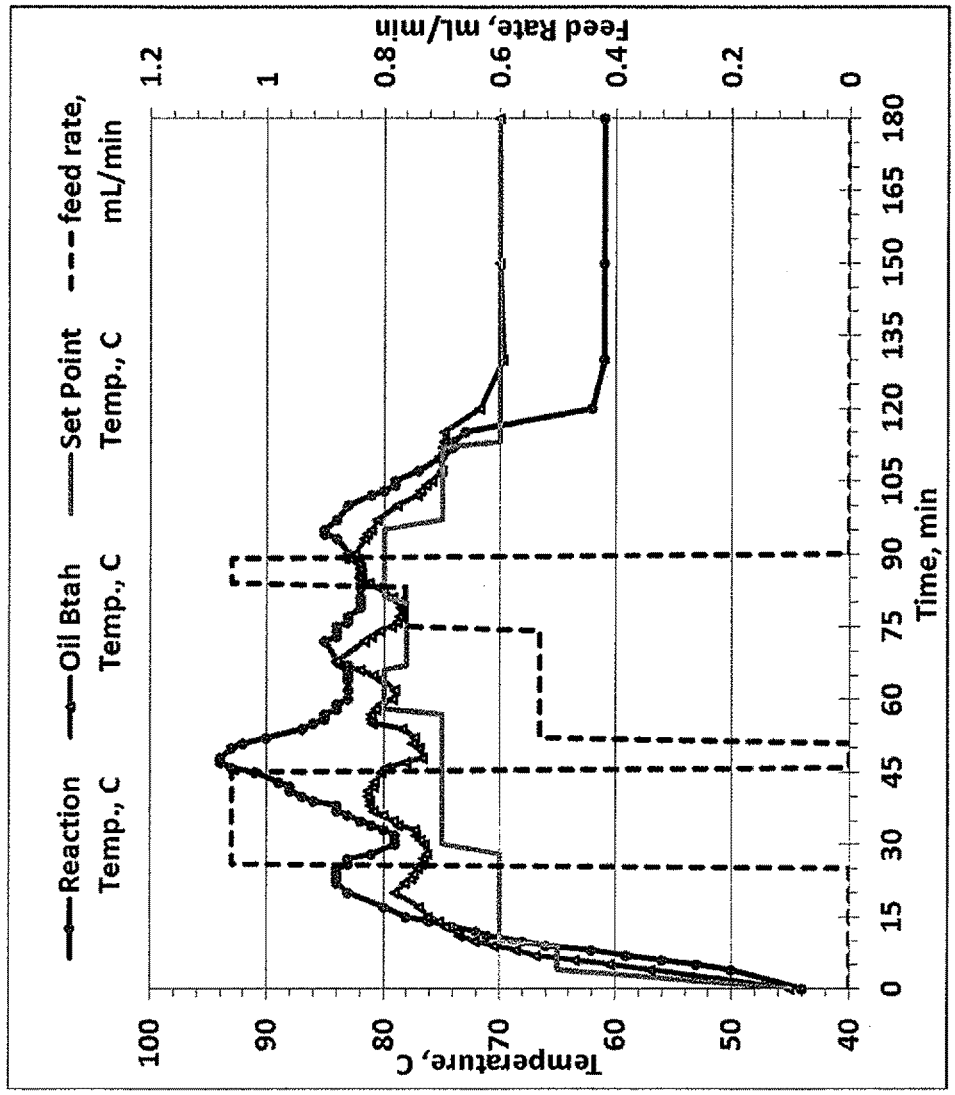
FIG. 2 is a graph illustrating a semi-batch reaction profile of the invention.

However, at least one embodiment involves the use of a continuous or semi-batch synthesis method which provides several advantages over the batch process commonly used. This involves adding only a portion of the G and E constituents either together or sequentially or individually in a form of a slow feed to initiate the primary epoxide ring opening reaction, followed by the slow continuous feeding of the two constituents G and E (either together or separately and at the same time or sequentially). This method allows for a much better control over the overall reaction, the reaction temperature and provides a better overall yield of the active compounds in the product also avoiding the undesired side reactions. (see FIG. 2).

In at least one embodiment the synthesis reaction utilizes constituent G=3-glycidoxypropyltrimethoxysilane. Prolonged exposure at high temperatures above 120° C. can result in internal coupling reactions and multiple substitutions with the reactive amine groups such as hexane diamine or ethylene diamine. The resulting un-hydrolyzed reaction products will turn to a gel over shorter time period accompanied by an increase in the reaction product viscosity. Use of a semi-batch process or continuous or separate or slow sequential or individual or combined feed of the E and G epoxides into the reaction mixture allows better control of the reaction temperature thereby reducing the amount of methanol that is generated and isolated during the reaction. Furthermore the reaction mixture has a lower viscosity and accounts for fewer undesired side reactions (see Table 1).

TABLE 1

Synthesis Reaction Data A:G:E reactions by various methods

| Batch # | Method | Reaction Temp F. | Viscosity of Reaction Intermediate, cps | MeOH Isolated, lbs |
|---|---|---|---|---|
| 1 | Batch | 240-265 | 550 | 9.8 |
| 2 | Batch on Batch | 225-235 | 240 | 1.6 |
| 3 | Semi-Batch | 180-200 | 65 | 0.7 |

Examples of the relative DSP scale inhibition of various A:G:E small molecules formed during the synthesis reaction disclosed above.

The scale inhibition performance of the small molecule is typically performed as follows:

1) A small amount of sodium silicate (0.25-1.5 g/L as $SiO_2$) is added to a Bayer refinery spent liquor at room temperature to raise the silica concentration in the liquor.

2) Portions of this liquor sample are dosed with varying amounts of the new scale inhibitor compound or mixture.

3) Dosed and untreated (or Blank) liquor samples are subjected to elevated temperatures between 96 to 105° C. for 4 to 6 hours.

4) Samples are then cooled and the amount of DSP scale formed in each of the dosed liquors samples are measured and compared to that formed in the untreated or blank samples.

As an example, Table II shows the relative DSP Scale Inhibition for several A:G:E synthesized mixtures using the synthesis reaction disclosed earlier, with various amine constituents as the core.

TABLE II

Relative DSP Scale Inhibition for Various A:G:E Synthesized Reaction Mixtures, where
A = Amine
G = Glycidoxypropyltrimethoxysilane
E = 2-Ethylhexyl glycidyl ether

| A:G:E Compounds<br>A = Amine Used | Amount of DSP Scale mg, versus Treatment | | | % Reduction in DSP Scale versus Blank | |
|---|---|---|---|---|---|
| | Un-treated | Low Dose | High Dose | Low Dose | High Dose |
| Hexane Diamine | 26.20 | 0.18 | 0.06 | 99.3% | 99.8% |
| Ethylene Diamine | 27.30 | 20.40 | 8.12 | 25.3% | 70.3% |
| Diethylene Triamine | 26.70 | 18.30 | 10.27 | 31.5% | 61.5% |
| Tetraethylene pentaamine | 24.60 | 22.50 | 16.80 | 8.5% | 31.7% |
| 1-amino-2-propanol | 26.20 | 3.50 | 0.05 | 86.6% | 99.8% |

While this invention may be embodied in many different forms, there are shown in the drawings and described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the reduction of aluminosilicate containing scale in a Bayer process comprising:
adding to a Bayer process stream an aluminosilicate scale inhibiting amount of a composition comprising a non-polymeric continuous or semi-batch reaction product of hexane diamine, glycidoxypropyltrimethoxysilane, and 2-ethylhexyl glycidyl ether.

2. The method of claim 1, wherein the non-polymeric continuous or semi-batch reaction product is present in a solution in an amount ranging from about 0.01 to about 100 wt %.

3. The method of claim 1, wherein the composition further comprises an item selected from the group consisting of: an amine, an activator, an antifoaming agent, a co-absorbent, a corrosion inhibitor, a coloring agent, and combinations thereof.

4. The method of claim 1, wherein the composition further comprises a solvent selected from the group consisting of: water, an alcohol, a polyol, and combinations thereof.

5. The method of claim 1, wherein the non-polymeric continuous or semi-batch reaction product is isolated in the form of a solid, precipitate, gel, salt and/or crystalline material.

6. The method of claim 1, wherein the non-polymeric continuous or semi-batch reaction product is hydrolyzed prior to being added to the Bayer process.

7. The method of claim 1, wherein the continuous or semi-batch reaction proceeds at a temperature range of about 180° F. to about 200° F.

8. The method of claim 7, wherein an intermediate of the continuous or semi-batch reaction has a viscosity of about 65 cPs.

9. A method for the reduction of aluminosilicate containing scale in a Bayer process comprising: mixing with a Bayer process stream an aluminosilicate scale inhibiting amount of a composition comprising at least one non-polymeric continuous or semi-batch reaction product, the at least one non-polymeric continuous or semi-batch reaction product comprising at least three components, wherein
the first component is hexane diamine;
the second component is 3-glycidoxypropyltrimethoxysilane, and wherein the second component is optionally hydrolyzed; and
the third component is 2-ethylhexyl glycidyl ether.

10. The method of claim 9, wherein the composition is hydrolyzed prior to being added to the Bayer process.

* * * * *